United States Patent
Cherubini et al.

(10) Patent No.: US 9,058,828 B1
(45) Date of Patent: Jun. 16, 2015

(54) SERVO PATTERN OF A TAPE STORAGE MEDIUM

(71) Applicant: INTERNATIONAL BUSINESS MACHINES CORPORATION, Armonk, NY (US)

(72) Inventors: Giovanni Cherubini, Rueschlikon (CH); Johan B.C. Engelen, Rueschlikon (CH); Simeon Furrer, Rueschlikon (CH); Jens Jelitto, Rueschlikon (CH); Mark A. Lantz, Rueschlikon (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/278,881

(22) Filed: May 15, 2014

(51) Int. Cl.
G11B 5/584 (2006.01)

(52) U.S. Cl.
CPC ............ *G11B 5/584* (2013.01); *G11B 2220/90* (2013.01)

(58) Field of Classification Search
None
See application file for complete search history.

(56) References Cited

U.S. PATENT DOCUMENTS

| | | | | |
|---|---|---|---|---|
| 4,318,141 A * | 3/1982 | Haynes | .................... | 360/77.01 |
| 4,680,648 A | 7/1987 | Takayama | | |
| 4,996,609 A | 2/1991 | Joannou | | |
| 5,253,131 A | 10/1993 | Chevalier | | |
| 5,319,502 A | 6/1994 | Feig | | |
| 5,371,638 A * | 12/1994 | Saliba | ....................... | 360/77.12 |
| 5,949,607 A * | 9/1999 | Kalfs et al. | ................. | 360/78.02 |
| 6,023,385 A | 2/2000 | Gillingham et al. | | |
| 6,785,085 B2 | 8/2004 | Guzik et al. | | |
| 6,873,487 B2 | 3/2005 | Molstad | | |
| 7,342,734 B1 * | 3/2008 | Patapoutian et al. | ........... | 360/29 |
| 7,379,254 B2 | 5/2008 | Langlois et al. | | |
| 8,089,716 B2 | 1/2012 | Takayama et al. | | |
| 8,810,938 B1 | 8/2014 | Madden et al. | | |
| 2002/0041982 A1 * | 4/2002 | Katashima et al. | .... | 428/694 BM |
| 2005/0249106 A1 * | 11/2005 | Coker et al. | ............... | 369/275.1 |
| 2005/0254156 A1 * | 11/2005 | Bandic et al. | ................... | 360/48 |
| 2007/0047131 A1 * | 3/2007 | Berman et al. | ............ | 360/77.01 |
| 2009/0073604 A1 * | 3/2009 | Johnson et al. | ............ | 360/77.12 |

(Continued)

FOREIGN PATENT DOCUMENTS

| | | |
|---|---|---|
| CN | 103854675 A | 6/2014 |
| EP | 0 138 210 A2 | 4/1985 |

(Continued)

OTHER PUBLICATIONS

Lantz et al., "Nanoscale Track-follow Performance for Flexible Tape Media", International Federation of Automatic Control (IFAC); Preprints of the 18th IFAC World Congress, Milano, Italy; Aug. 28-Sep. 2, 2011, pp. 869-874.

(Continued)

*Primary Examiner* — Paul Huber
(74) *Attorney, Agent, or Firm* — Scully, Scott, Murphy & Presser, P.C.; Gail H. Zarick, Esq.

(57) ABSTRACT

A tape storage medium comprises at least one servo band (SB) along a longitudinal extension (x) of the tape storage medium (TP) for supporting to determine positional information. The servo band (SB) comprises a set of servo tracks (STx) extending along the longitudinal extension (x) of the tape storage medium (TP) and arranged next to each other. Each servo track (STx) of the set contains a servo pattern with magnetic transitions at a defined frequency (fx), wherein the frequencies (fx) of magnetic transitions of servo patterns of adjacent servo tracks (STx) are different from each other. The set of servo tracks (STx) contains at least three servo tracks (STx) with magnetic transitions of different frequencies (fx).

14 Claims, 4 Drawing Sheets

(56) References Cited

U.S. PATENT DOCUMENTS

| | | | |
|---|---|---|---|
| 2010/0246043 A1* | 9/2010 | Barsotti et al. | 360/31 |
| 2011/0043945 A1* | 2/2011 | Cherubini et al. | 360/77.12 |
| 2011/0149434 A1 | 6/2011 | Coker et al. | |
| 2012/0019948 A1 | 1/2012 | Fasen | |
| 2012/0281309 A1* | 11/2012 | Fasen et al. | 360/73.04 |
| 2013/0242427 A1* | 9/2013 | Dugas | 360/51 |
| 2013/0321953 A1 | 12/2013 | Dellmann et al. | |
| 2014/0126078 A1 | 5/2014 | Biskeborn et al. | |

FOREIGN PATENT DOCUMENTS

| | | |
|---|---|---|
| EP | 0 405 900 A2 | 1/1991 |
| EP | 0 443 460 A2 | 8/1991 |
| EP | 0 443 810 A2 | 8/1991 |
| EP | 0 923 078 A1 | 6/1999 |
| EP | 1 271 477 B1 | 1/2003 |
| JP | 59030229 A | 2/1984 |
| WO | WO 2005/109405 A1 | 11/2005 |

OTHER PUBLICATIONS

Lantz et al., "Servo-Pattern Design and Track-Folllowing Control for Nanometer Head Positioning on Flexible Tape Media", IEEE Transactions on Control Systems Technology, vol. 20, No. 2, Mar. 2012, pp, 369-381.

* cited by examiner

SERVO PATTERN OF A TAPE STORAGE MEDIUM

FIELD OF THE INVENTION

The present invention relates to a tape storage medium, a tape drive, and a method for operating a tape drive for reading and/or writing data from/to a tape storage medium.

BACKGROUND

Tape storage media typically comprise servo information prerecorded in one or more of dedicated servo bands that extend next to data bands for storing data, which servo bands extend in a longitudinal direction along the tape medium. A servo band typically is read by a dedicated servo reader of a tape head of a tape drive, into which tape drive a cartridge containing the tape storage medium is inserted to. The read servo information allows for determining a lateral deviation of the tape storage medium from a reference position, which reference position is desired for correctly reading data from and writing data to the tape storage medium by dedicated data readers and writers of the tape head. A position error signal representing the lateral deviation will be translated into a control signal for an actuator for controlling a lateral position of the tape head with respect to the tape medium.

BRIEF SUMMARY OF THE INVENTION

According to an embodiment of a first aspect of the present invention, a tape storage medium is provided comprising at least one servo band along a longitudinal extension of the tape storage medium for supporting to determine positional information. The servo band comprises a set of servo tracks extending along the longitudinal extension of the tape storage medium and arranged next to each other. Each servo track of the set contains a servo pattern with magnetic transitions at a defined frequency, wherein the frequencies of magnetic transitions of servo patterns of adjacent servo tracks are different from each other. The set of servo tracks contains at least three servo tracks with magnetic transitions of different frequencies.

In embodiments, the tape storage medium may comprise one or more of the following features:
  for each servo track of the set the magnetic transitions in such servo track represent a periodic waveform when being read;
  the periodic waveforms of adjacent servo tracks are orthogonal to each other in their frequencies;
  one period of each periodic waveform represents a symbol and a maximum length of a symbol on the tape storage medium in any of the servo tracks is less than 5 μm;
  a maximum length of a symbol on the tape storage medium in any of the servo tracks is less than 2 μm;
  a maximum length of a symbol on the tape storage medium in any of the servo tracks is less than 1 μm;
  a maximum length of a symbol on the tape storage medium in any of the servo tracks is less than 500 nm;
  additional information is encoded in the servo pattern of one or more servo tracks which additional information is one or more of: longitudinal position information, manufacturing information, a servo band identifier, a servo track subset identifier;
  the additional information is encoded in the servo pattern of each servo track of the set,
  all the additional information as listed above is encoded into the servo pattern of each servo track of the set;
  the additional information is encoded in the one or more of the servo tracks by one or more of phase modulation, differential phase modulation, differential phase shift keying, and on-off keying.

According to an embodiment of another aspect of the present invention, a tape drive is provided for reading and/or writing data to/from a tape storage medium, preferably to a tape storage medium according to any one of the preceding embodiments. The tape drive comprises a tape head containing at least one servo reader assigned for reading from the servo band, wherein a width of the servo reader orthogonal to the longitudinal extension of the tape storage medium when arranged in the tape drive is at least a width of a servo track in the servo band orthogonal to the longitudinal extension of the tape storage medium.

In embodiments, the tape drive may comprise one or more of the following features:
  the width of the servo reader is equal to the width of a servo track in the servo band;
  the width of the servo reader is more than the width of a servo track in the servo band and is not more than twice the width of a servo track in the servo band.

According to an embodiment of another aspect of the present invention, a method is provided for operating a tape drive for reading and/or writing data from/to a tape storage medium according to any one of the preceding embodiments. The servo band is read by a servo reader. A lateral position value of a tape head containing the servo reader relative to the tape storage medium from a readback signal of the servo reader is determined. A lateral position of the tape head is adjusted dependent on the lateral position value.

In embodiments, the method may comprise one or more of the following features:
  determining the lateral position value includes identifying one or more frequencies of periodic waveforms in the readback signal of the servo reader;
  the waveforms present in the readback signal of the servo reader are detected by applying a discrete Fourier transform for periodic waveforms for determining the lateral position value;
  one or more ratios are built from energies of waveforms at different frequencies identified and the lateral position value is derived from the one or more ratios;
  the lateral position of the tape head is adjusted by a control signal that is updated each time a new lateral position value is determined.

According to an embodiment of a further aspect of the present invention, a computer program product is provided comprising a computer readable medium having computer readable program code embodied therewith, the computer readable program code comprising computer readable program code configured to perform a method according to any of the previous embodiments.

It is understood that method steps may be executed in a different order than listed in a method claim. Such different order shall also be included in the scope of such claim as is the order of steps as presently listed.

Embodiments described in relation to the aspect of a write head shall also be considered as embodiments disclosed in connection with any of the other categories such as the method.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

The figures are illustrating.

DETAILED DESCRIPTION OF THE EMBODIMENTS

Figure 1:
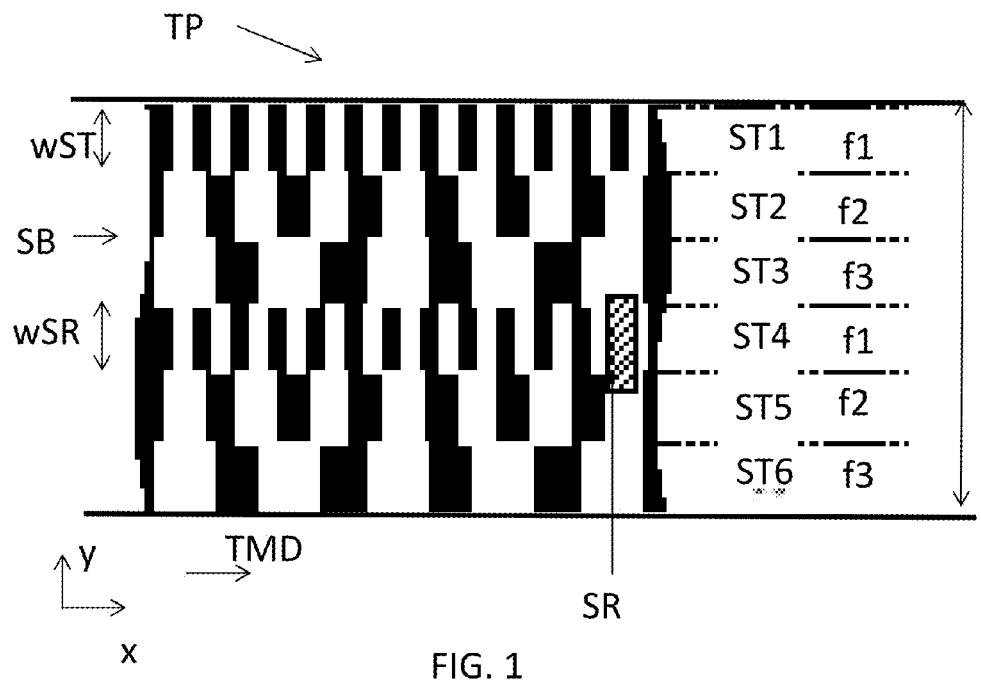
FIG. 1 a top view on a portion of a servo band of a tape storage medium according to an embodiment of the present invention, FIG. 2 a top view on a portion of tape storage medium according to an embodiment of the present invention, FIG. 3 a top view on a portion of a servo band of a tape storage medium according to an embodiment of the present invention, and related diagrams, FIG. 4 a top view on a portion of a servo band of a tape storage medium according to another embodiment of the present invention, and related diagrams, FIG. 5 a top view on a portion of a tape storage medium according to a further embodiment of the present invention, FIG. 6 a flowchart representing a method for operating a tape drive according to an embodiment of the present invention, and FIG. 7 a block diagram of selected items of a tape drive according to an embodiment of the present invention.

As an introduction to the following description, it is first pointed at a general aspect of the invention concerning a tape storage medium, a tape drive, and a method for operating a tape storage medium.

A tape storage medium for storing data—also abbreviated as tape—, and in particular a magnetic tape storage medium may be arranged in a cartridge which cartridge may be inserted into a tape drive for reading data from the tape storage medium and writing data to the storage tape medium. The tape storage medium has a longitudinal extension and a width orthogonal to its longitudinal extension. The tape is wound onto one or more reels which are driven by the tape drive in order to make the tape pass by data readers and writers of a tape head for reading and/or writing data from and/or to the tape storage medium. The tape storage medium typically is preformatted with servo information. This servo information in form of servo patterns enables a servo reader of the tape head during reading and/or writing data to pick up servo information as to a lateral position of the tape head with respect to the tape storage medium, which lateral position is a position orthogonal to the longitudinal extension of the magnetic tape storage medium. Such position information may be converted into a control signal for the tape head to laterally readjust in case a deviation from a lateral reference position is detected which lateral reference position is desired to be maintained by the tape head for correctly reading data from and writing data to the tape by the dedicated data readers and writers. The deviation signal, also denoted as position error signal (PES), is typically supplied by a servo channel processing a readback signal from the dedicated servo reader of the tape head and may be translated into a control signal for an actuator for controlling the lateral position of the tape head with respect to the tape. Given that in one embodiment the servo reader and the data readers and writers are mechanically coupled and can commonly be actuated by the actuator, a rapid correction of the tape head deviation may be achieved during reading and/or writing data from and/or to the tape. It is understood, that the term tape head may also refer to a tape head module into which one or more servo readers and data readers and/or writers are mechanically coupled while at the same time there may be additional tape head modules containing other servo readers and data readers and/or writers that are mechanically coupled which tape head modules may individually be controllable in their lateral position.

The servo patterns typically are preformatted, e.g. by the tape manufacturer, on dedicated areas of the tape, also denoted as servo bands extending along the longitudinal extension of the tape. The one or more servo bands extend next to data bands for storing data. Each data band may contain multiple data tracks, wherein each data track is provided for sequentially storing data. Servo information may take a shape different from data.

In a preferred embodiment, the tape storage medium comprises at least one servo band. In case of multiple servo bands, it is preferred that each servo band contains the structure with the multiple servo tracks as will be explained in more detail in the following. In particular, each servo band may then contain the identical servo information except for servo band or servo track specific information such as the servo band identifier if any.

The servo band contains multiple servo tracks adjacent to each other extending along a longitudinal extension of the servo band, i.e. along a longitudinal extension of the tape storage medium. Such multiple servo tracks may contain different servo patterns which allow for a precise position control. In one embodiment, the servo band may contain at least three servo tracks adjacent to each other. Preferably, the servo tracks adjacent to each other contain different servo patterns. Given that the tape storage medium typically is a magnetic storage medium, the servo pattern in each servo track is represented by magnetic transitions along the servo track. Such magnetic transitions represent a waveform in a readback signal of an assigned servo reader when such servo pattern would be individually read. In this context it is emphasized, that the waveform resulting from a servo pattern in an individual servo track shall encompass a representation of the subject signal in both the time domain and the frequency domain.

In case such servo band is read by a servo reader with a width being at least the width of an individual servo track in this servo band—and preferably less than an accumulation of the widths of all servo tracks—such servo reader may either provide a readback signal with a single waveform originating from a single track only in case the servo reader is exactly positioned over the center of one of the tracks and as such exclusively covers this track and provided its width is equal to the width of a servo track, or provide a readback signal containing two or more different waveforms originating from two or more tracks when the servo reader covers these two or more servo tracks at least to some extent which may be the case when its width is equal to the width of a servo track and is the case when its width is more than the width of a servo track. The subject waveforms then overlap in the readback signal of the servo reader and, in other words, the readback signal of the servo reader may be composed of two or more overlying different waveforms stemming from magnetic transitions of adjacent servo tracks the servo reader currently scans. For allowing to determine which waveforms are present in a readback signal of the servo reader, it is preferred that the waveforms of adjacent servo tracks are orthogonal to each other. This means, that the waveforms and hence the underlying servo patterns in at least two adjacent servo tracks are distinguishable when being present in a common signal or channel at least in one of the time domain or the spectral domain such that by applying an appropriate analysis in either of the domains, the waveforms contained in the readback signal can be identified.

Given that overall at least three different waveforms are used in the servo tracks, it is preferred that each waveform is orthogonal to each of the other waveforms used.

Orthogonality in multichannel signal transmission preferably is fulfilled if a product of the spectrum or a correlation of the time function of the subject waveform with a waveform in an adjacent track is zero. This means, that a cross-correlation between any two different waveforms preferably is zero either in the time domain or in the spectral domain for all different waveforms applied such that the waveforms preferably used in the different servo tracks, and hence their underlying magnetic transition schemes defining the different servo patterns are preferably orthogonal.

In one embodiment, the waveforms represented by the underlying servo patterns of different servo tracks are characterized in the spectral domain by different defined frequencies of magnetic transitions in the subject servo track. Specifically, a waveform with a defined frequency in the spectral domain is a periodic waveform in the time domain, and preferably a sinusoidal waveform in the time domain. Those waveforms are orthogonal in the spectral domain which qualifies them as suitable waveforms. The readback signal of the servo reader then preferably is analyzed in the spectral domain. The underlying servo patterns arranged in the different servo tracks may preferably belong to a class of energy based servo (EBS) patterns. If such servo patterns of multiple servo tracks are read by a single servo reader covering a multiple of the servo tracks while reading, the readback signal from the servo reader provides different energies at different frequencies subject to the coverage of the different servo tracks. By means of evaluating the energies in the readback signal at the various frequencies and specifically by building ratios between the various energies, a lateral position of the servo reader can be determined with respect to the tape. In case a data reader for reading data and a data writer for writing data are mechanically coupled with the subject servo reader, any lateral deviation of the subject servo reader detected by reading the servo band also is valid for the data reader and the data writer. Hence, any lateral actuation of the tape head including the subject servo reader, the data reader and the data writer may correct for the detected deviation and bring the data reader and the data writer back on their desired lateral positions.

The servo band preferably is reserved for servo patterns aiming at fast and granular acquisition of lateral position information. The servo patterns preferably have an inherent high density in magnetic transitions—this is why these servo patterns here also are referred to as high density patterns—in order to enable frequent and, subject to the granularity of the servo tracks in the servo band, very accurate estimates of servo channel parameters such as the lateral position, thereby enabling improved tape head positioning at a much wider tape velocity range and supporting for larger bandwidth head actuation.

Preferably, the high density servo patterns in the multiple servo tracks are the sole servo patterns in the servo band, and in particular there is no additional frame based servo pattern provided in the same servo band.

The embodiments of the present invention may enable an increase in data track density envisaged for future tape drives, given that the lateral position of the tape head and potentially its skew with respect to tape can be determined at a finer scale, at a higher estimation rate, and with lower latency compared to conventional tape storage systems. The high density servo pattern may allow for a repetition rate of head lateral position estimates sufficiently high to guarantee proper track following operation even at a very low tape velocity. In addition, actuators of future tape heads with large bandwidths are supported. Hence, the presently introduced new servo format for tape storage media targets such as BaFe tape media, with 4 or 8 data bands, and with 32 or 64 parallel data channel, as possible applications. Hence, a deviation in the position error signal (PES) is minimized thus enabling (data) track density scaling for tape capacities of up to hundreds of terabytes. In addition, data rate scaling with host computer requirements through the support of a wider velocity range may be improved. Furthermore, the high density pattern may also be utilized to generate a reference periodic signal (pilot signal) for aiding the timing recovery process for data detection in the data channels.

Servo patterns of the present kind may be written during tape manufacturing, or may be written during operation of the tape storage medium in a tape drive, i.e. by self servo writing. In the servo writing during tape manufacturing, a write head for writing the servo patterns into the servo band is preferred to enable writing the different servo patterns to the different servo tracks at the same time, i.e. the servo patterns are written to the multiple adjacent servo tracks simultaneously, i.e. the tape is required to pass the write head only once for writing the desired servo patterns. In a preferred embodiment, continuous writing is applied for writing the servo patterns to the tape. In continuous writing, which is also denoted as trailing-edge writing, the write head continuously writes without interruption, i.e. a current applied to the write head is continuously switched between positive and negative current values. This enables writing features that are much smaller than when using pulsed writing in which the current is switched on and off while moving the tape by the write head.

In self servo writing the servo patterns are written concurrently with the writing of data tracks. In this case, a tape head module preferably hosts an additional writer, acting as self-servo writer, and a dedicated self-servo reader. Note that a placement of a self-servo writer/reader pair can be anywhere within the tape head, e.g., in the center. Also note that, in principle, more than one self-servo writer/reader pair can be implemented in the tape head module. Note that further information can be embedded in the multi-tone servo patterns (LPOS, band ID, etc.) by, e.g., modulating the phase of segments of the sinusoidal waveforms at well-defined positions, or leaving short gaps between bursts of each tone, and encoding the information in the presence or absence of a gap or in the length of a gap. Even in the event of such gaps, the associate servo pattern may be considered as a frameless continuous servo pattern.

According to another aspect of the invention, a tape drive is provided comprising a tape head. The tape head contains at least one servo reader assigned for reading from the servo band. In one embodiment, the tape head comprises only a single servo reader in a dimension orthogonal to the longitudinal extension of the tape storage medium when arranged in the tape drive for reading from the servo band.

Preferably, a width of the servo reader orthogonal to the longitudinal extension of the tape storage medium when arranged in the tape drive is at least a width of a servo track in the servo band orthogonal to the longitudinal extension of the tape storage medium. Applying multiple servo readers laterally offset and each with a width smaller than the width of the servo track shall be encompassed by this definition, too.

In another embodiment, two servo readers for reading from the servo band are arranged adjacent but separate from each other orthogonal to the longitudinal extension of the tape. In case of two servo readers, one of the servo readers may read in a forward tape motion direction and the second servo reader may read in a backward tape motion direction.

FIG. 1 provides an illustration of a section of a servo band SB contributing to a tape storage medium TP together with data bands and possibly further servo bands. The servo band SB extends along a longitudinal axis x which at the same time represents the direction into which the tape storage medium TP extends, and along which the tape storage medium TP is moved during operation, i.e. the tape moving direction TMD. Preferably, the servo band SB extends all along the longitudinal extension of the tape storage medium TP such that the shown servo patterns represent only a very small cut whereas in practice the shown servo patterns are repeated for several million times along the tape storage medium TP in each servo band SB.

Figure 2:
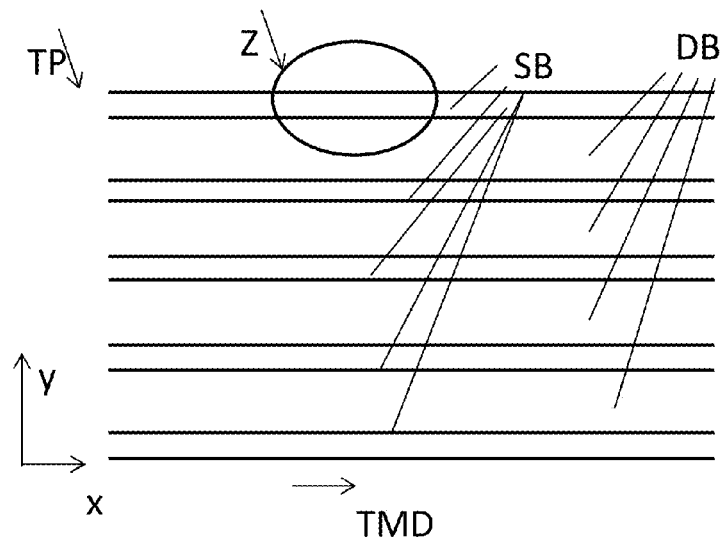

For illustrating a sample servo band/data band structure on a tape storage medium it is referred to FIG. 2. In this schematic top view on a section of a tape storage medium TP the tape TP has a longitudinal extension in x direction and a lateral extension in y direction. The longitudinal extension in x direction is parallel to a tape motion direction TMD, assuming there is no tape skew. Servo bands SB and data bands DB extend along the longitudinal extension of the tape TP. Each data band DB is arranged in between two servo bands SB. Each data band DB contains multiple data tracks not shown in detail wherein preferably multiple of these data tracks of a data band DB are written and/or read simultaneously in case a tape head of the tape drive provides multiple write and/or read elements. Each servo band SB contains servo patterns arranged along the longitudinal extension of the tape TP, such as shown in FIG. 1. In particular, a cutout Z of the top most servo band SB may be illustrated in FIG. 1.

While reading and/or writing data from and/or to the tape, the tape moves relative to a tape head in the longitudinal direction x. In addition, the tape head preferably is movable in the lateral direction y, i.e., transverse to the direction x, by means of a suitable actuator. However, due to a lateral offset of the tape with respect to the tape head, a misalignment of both may occur. For realigning the tape with the tape head, the position of the tape head relative to the tape is estimated from the signal obtained by reading the servo patterns in the servo band.

Returning to FIG. 1, the servo band SB is organized in multiple parallel servo tracks STx. In the present embodiment, six adjacent servo tracks ST1 to ST6 are provided, however, any number of servo tracks >2 may be provided subject to the sensitivity in lateral position sensing to be achieved, subject to a width provided for the servo band SB, and subject to a width wSR of an assigned servo reader. It is assumed that each servo track STx is of the same width wST in lateral dimension y, i.e. orthogonal to the longitudinal extension of the tape TP. Each servo track STx contains a dedicated servo pattern. The servo pattern in a servo track of the servo band SB may preferably be characterized by being a continuous servo pattern extending all along the servo band and consequently all along the tape storage medium TP, and be characterized by being a frameless servo pattern such that lateral position information may be derived from the servo pattern continuously while reading with the servo reader SR without the need to wait for the completion of reading an entire servo frame FR, as is the case when operating with a frame based servo pattern.

Preferably, the storage patterns at least of adjacent servo tracks differ from each other such that they are orthogonal as previously described.

In the embodiment as is shown in FIG. 1, the servo pattern in each servo track STx may contain magnetic transitions at different frequencies. In the present example, the magnetic transitions are provided with three different frequencies f1, f2 or f3 wherein each transition from a white to a black region or vice versa denotes a magnetic transition. In the present example, the frequencies f1>f2>f3 and every two adjacent servo tracks STx contain a servo pattern of magnetic transitions of different frequency fx. Moreover, the same servo pattern is applied to every third servo track, such that the servo tracks ST1 and ST4 contain the identical servo pattern. So do the servo tracks ST2 and ST5, and ST3 and ST6 respectively. Hence, triplets of servo tracks STx are identical to each other. In a preferred embodiment, it is preferred that the set of servo tracks is organized into triplets of identical servo tracks wherein in each triplet periodic waveforms with three different frequencies are used.

The servo reader SR assigned to presently read the servo band SB of the tape TP has the width wSR of at least the width of each servo track STx, i.e. wSR=>wST, and in case of servo tracks of different width of at least the width of the servo track with the smallest width. The width wSR of the servo reader SR reflects its extension into lateral direction, i.e. orthogonal to the longitudinal extension of the tape TP. Preferably, the width wSR of the servo reader SR is more than the width wST of each servo track STx such as is shown in the embodiment of FIG. 1.

While moving the tape TP across the tape head including the servo reader SR in tape motion direction TMD, the servo reader SR provides a sensor signal, also denoted as readback signal, containing at least components of two of the three frequencies f1, f2, f3 in view of the width wSR of the servo reader SR exceeding the width wST of the servo tracks STx. Subject to the lateral position of the servo reader SR, energies of the two or three frequency components in the readback signal vary. From the identified presence and the energies, a lateral position value of the servo reader SR with respect to the tape TP can be derived.

In a preferred embodiment, additional information may be encoded into the servo tracks. Such additional information may, for example, be the presently scanned longitudinal position of the tape. Such longitudinal position information, also denoted as LPOS, may in one embodiment be encoded in the servo patterns of all servo tracks. Hence, the longitudinal position of the tape may be identified based on the LPOS information read by the servo reader. The LPOS information may be used for winding the tape media to a given longitudinal position and, for example, starting reading and/or writing at such specified longitudinal position. Other information such as manufacturing information may be added too, preferably to each servo track, which, for example, may indicate the manufacturer of the tape cartridge, the date of manufacturing the tape cartridge, information as to the standard the present cartridge may conform to, etc. . . . . . Other additional information may be a servo band identifier or an identifier of a servo track subset identifier, such as, for example, for identifying in which servo track subset, e.g. triplet, the servo reader currently reads from. This information may be due to its nature different in each servo band or each servo track subset.

Generally, the presently introduced new servo format with a set of servo tracks adjacent to each other may claim the same width wSB of the tape, see FIG. 1, as previously used servo formats may have. In other embodiments, the presently introduced new servo format with a set of servo tracks adjacent to each other may claim a width wSB of the tape smaller than previously used servo formats.

Figure 3:
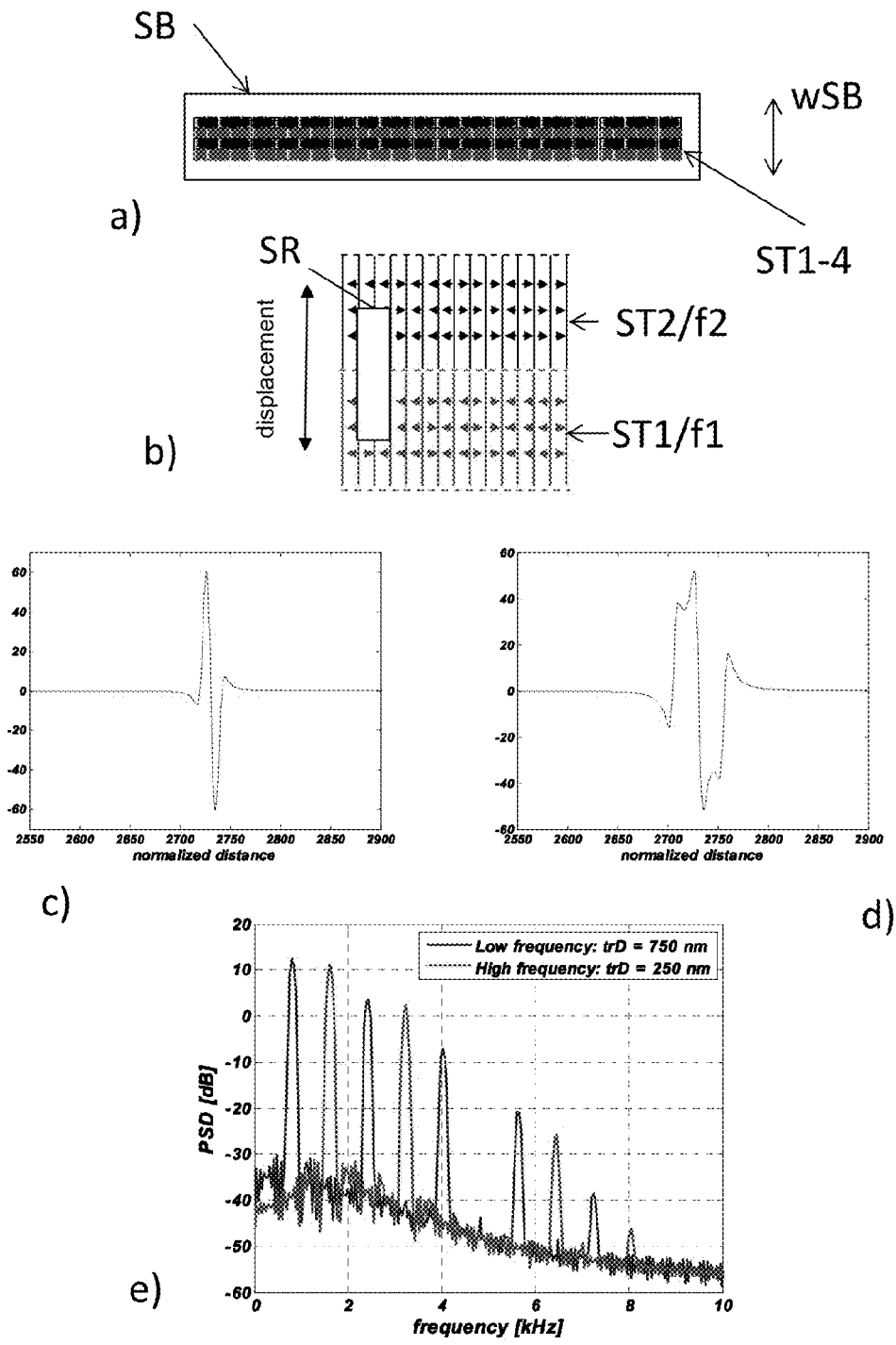

FIG. 3 illustrates in diagram a) a section of a servo band SB according to an embodiment of the present invention, which servo band SB contains multiple high density servo patterns arranged in several servo tracks ST1 to ST4 parallel to each other, which four servo tracks ST1 to ST4 are only exemplary for illustration purposes. In this embodiment, the high density patterns are represented by multi-frequency patterns also denoted as multi-tone patterns. In particular, periodic sequences of magnetic transitions with negligible overlapping of spectral content are used not only in adjacent servo tracks ST1 to ST4 but in all servo tracks ST1 to ST4. Diagram 3b) is a cutout of the first servo tracks ST1 and ST2 of the servo band SB of diagram 3a): A high-frequency waveform is used in servo track ST1 having 100 periods within 76 μM, which results in a symbol length of 0.76 μm. A symbol refers to one period in the periodic waveform. In servo track ST2, a lower-frequency waveform is used having 50 periods within 76 μm which results in a symbol length of 1.52 μm. The other servo tracks ST3 and ST4 may contain higher frequency waveforms with associate frequencies f3>f2 and f4>f3. The arrows in diagram 3b) do not match any frequency relations described but only reflect magnetic transitions in general. A servo reader SR is shown in diagram 3b) with a width corresponding to the width of the servo tracks STx.

For illustration purposes, in diagram 3c), a waveform is shown in the time domain for the servo reader SR exclusively covering the first servo track ST1 without any overlap into the second servo track ST2, and only a single symbol comprising two magnetic transitions is provided with a magnetically erased area next to the left and to the right of the two magnetic transitions in the first servo track ST1. In diagram 3d) a waveform is shown in the time domain for the servo reader SR exclusively covering the second servo track ST2 without any overlap into the first servo track ST1, and only a single symbol comprising two magnetic transitions is provided with a magnetically erased area next to the left and to the right of the two magnetic transitions in the second servo track ST2. In diagram 3e), a frequency spectrum is shown of a readback signal of the servo reader SR being positioned according to diagram 3b) and covering the first and the second servo track ST1 and ST2 to the same extent. From such frequency representation it can be derived that both frequencies f1 and f2 appear with the same energy, given that the second servo reader SR2 overlaps both servo tracks ST1 and ST2 to the same extent. Diagram 3e) further shows additional double frequency peaks representing harmonic frequencies resulting from the magnetic transitions. In any case, the frequency spectrum of the adjacent servo patterns is chosen such that the two patterns can be discriminated and only negligibly interfere. In the present example, the tape is assumed to be moved at a speed of 5.1 m/s.

Hence, in general the servo reader provides a readback signal that can be detected by a discrete Fourier transform based detector for periodic waveforms to determine a lateral position value. The servo patterns in the servo band may also be used to generate a pilot signal supporting a timing recovery process of data in the data tracks. A servo reader position relative to an edge between adjacent servo patterns of adjacent servo tracks in the servo band can be derived from the readback signal of the servo reader that is provided to a detector that detects and discriminates an energy contained in the different servo patterns sensed by the servo reader. Ambiguity between repeating servo patterns, e.g. in the case of x different servo patterns used in a number of servo tracks >x may be avoided by encoding servo track subset information into the servo tracks.

Figure 4:
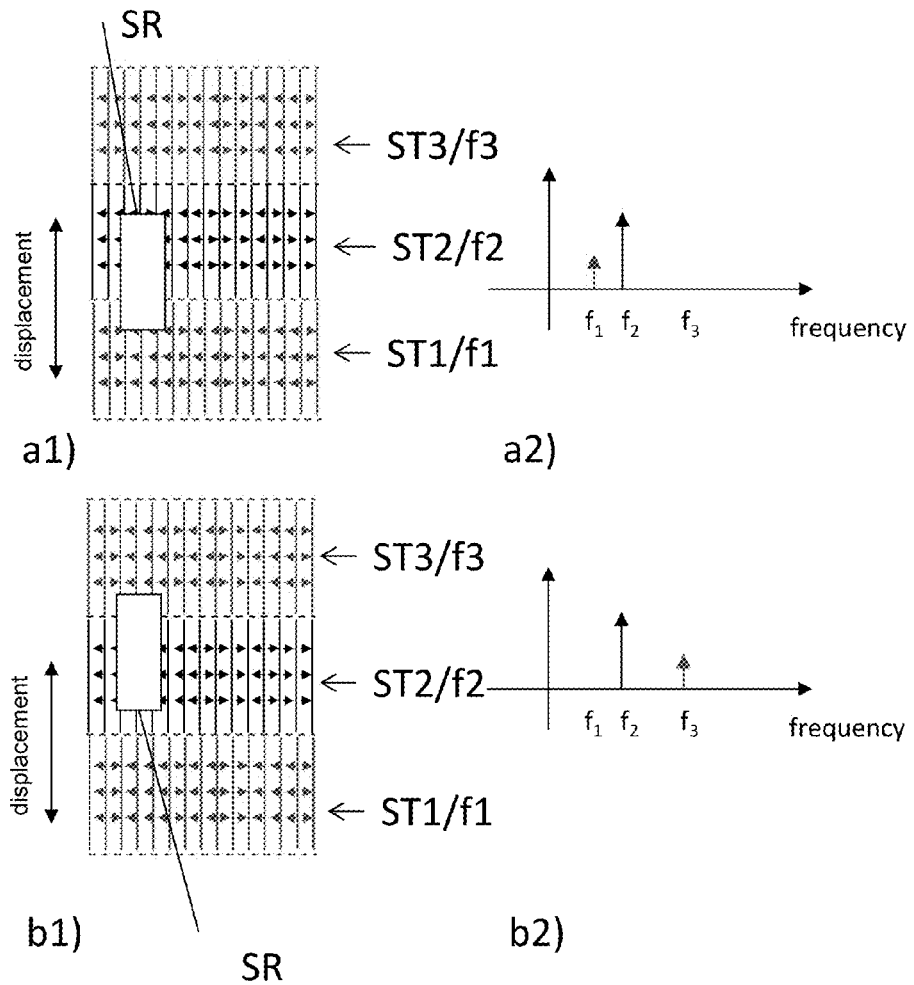

In FIG. 4 an embodiment of a servo band SB containing three servo tracks ST1 to ST3 is shown with each of the servo tracks ST1 to ST3 containing a servo pattern of magnetic transitions at a different frequency f1, f2 and f3. In the present example, the first servo track ST1 contains a servo pattern at a first frequency f1, the second servo track ST2 contains a second servo pattern at a second frequency f2, and the third servo track ST3 contains a servo pattern at a third frequency f3, wherein f1<f2<f3. Again, a servo reader SR is provided with a width corresponding to the width of each servo track STx. Hence, an edge between the second servo track ST2 and the first servo track ST1, as is represented by a lateral position of the servo reader SR as shown in diagram 4a1), can be discriminated from an edge of the second servo track ST2 and the third servo track ST3, as is represented by the lateral position of the servo reader SR as shown in diagram 4b1), by means of identifying the various frequencies in the readback signal and evaluating their energies as is shown in the diagrams 4a2) and 4b2) respectively. In the scenario of diagram 4a1), in addition to the second frequency f2, the first, lower frequency f1 is present in the readback signal of the servo reader SR and can be detected by a spectral analysis. The energies of the spectral components f1 and f2 represent the relation of the servo reader SR overlapping the first and the second servo tracks ST1 and ST2. Given that the energy of the spectral component of frequency f1 is smaller than the energy of the spectral component of the second frequency f2, it follows that the servo reader SR covers the second servo track ST2 more than the first servo track ST1. From a ratio of the corresponding energies a fine position of the servo reader SR with respect to the tape can be derived. In the scenario of diagram 4a2), in addition to the second frequency f2, the third, higher frequency f3 is present in the readback signal of the servo reader SR and can be detected by a spectral analysis. The energies of the spectral components f2 and f3 again represent the relation of the servo reader SR overlapping the second and the third servo tracks ST2 and ST3. Given that the energy of the spectral component of the third frequency f3 is smaller than the energy of the spectral component of the second frequency f2, it follows that the servo reader SR covers the second servo track ST2 more than the third servo track ST3. From the ratio of the corresponding energies a fine position of the servo reader SR with respect to the tape can be derived.

Figure 5:
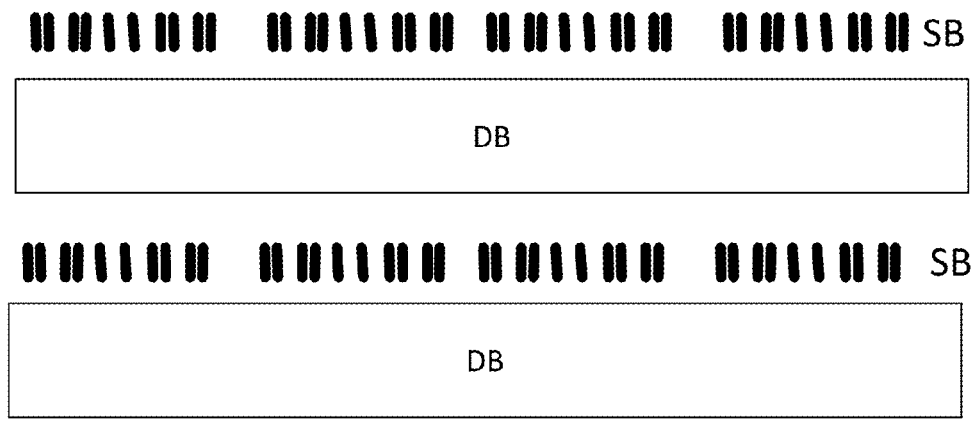

FIG. 5 illustrates a section of a tape storage medium according to another embodiment of the present invention. Data bands DB are sandwiched in between servo bands SB. The servo bands SB include high density servo patterns as only schematically represented by vertical stripes. A varying distance between the vertical stripes indicates that such high density servo pattern in the servo band SB may also contain additional information embedded such as LPOS information, servo band ID information, manufacturing information, etc.

Figure 6:
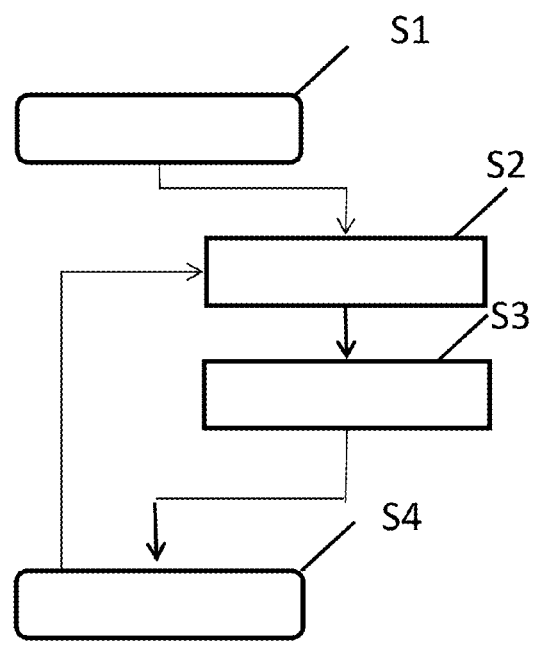

FIG. 6 shows a flow chart according to an embodiment of the present invention. In step S1, the method is started, for example, by activating the tape drive for reading and or writing data to a tape storage medium in a tape cartridge inserted into the tape drive. It is assumed that the tape is already positioned at the desired longitudinal position. Then, while in step S1 the tape is already moved at a desired tape velocity, in step S2 the servo information from the servo band is read.

In step S3, the servo information read by the servo reader assigned to the servo band is analyzed and a lateral position value is determined from the readback signal of the servo reader. Preferably, a spectral analysis is performed on the readback signal and the lateral position value is estimated based on the identified frequencies in the spectral waveform. Hence, a control signal is derived from the lateral position value for controlling the actuator of the tape head for positioning the tape head laterally in step S4. The process continues by reading the servo information by the servo reader in step S2, which process of course continuous. The rate of providing the lateral position values in this frameless servo pattern is not limited to a servo pattern segment to be first completely scanned before gaining information on the lateral position. Instead, the rate of the lateral position values depends on a length of the symbols used and, of course, further depends on the tape velocity.

Figure 7:
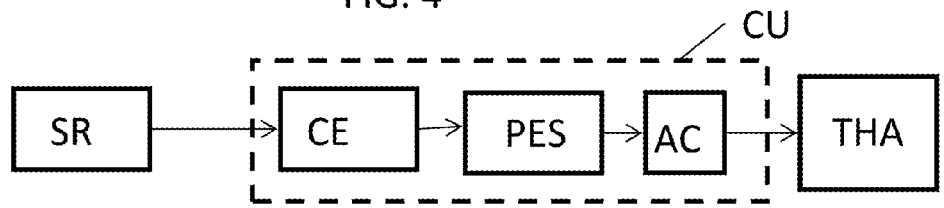

FIG. 7 illustrates a block diagram of a tape drive according to an embodiment of the present invention. The servo reader SR provides its readback signal to a control unit CU. The readback signal of the servo reader SR is received by a spectral analyzer unit SA and a lateral position value is determined. The lateral position value is then converted into a position error signal by a determination unit PES A tape head actuator controller AC unit translates the position error signal PES into a control signal for the tape head actuator THA, which then adjusts the lateral position of the tape head to which the servo reader SR is attached to.

Note that in all the considered embodiments the high density pattern may be utilized as a reference signal for aiding the timing recovery process for data detection in the data channels.

It will be understood by those skilled in the art that many modifications and permutations may be made without departing from the scope of the present invention.

As will be appreciated by one skilled in the art, aspects of the present invention may be embodied as a tape storage medium, a method for reading and/or writing data from and/or to a tape storage medium, or a computer program product. Accordingly, aspects of the present invention, in particular in form of the controller/control unit, may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention, such as the write methods, may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The invention claimed is:

1. A tape storage medium, comprising at least one servo band (SB) along a longitudinal extension (x) of the tape storage medium (TP) for supporting to determine positional information which servo band (SB) comprises a set of servo tracks (STx) extending along the longitudinal extension (x) of the tape storage medium (TP) and arranged next to each other,
   wherein each servo track (STx) of the set contains a servo pattern with magnetic transitions at a defined frequency (fx),
   wherein the frequencies (fx) of magnetic transitions of servo patterns of adjacent servo tracks (STx) are different from each other, and
   wherein the set of servo tracks (STx) contains at least three servo tracks (STx) with magnetic transitions of different frequencies (fx), and wherein additional information is encoded in the servo pattern of one or more servo tracks (STx), which additional information is one or more of: a longitudinal position information, a manufacturing information, a servo band identifier, or a servo track subset identifier.

2. The tape storage medium according to claim 1, wherein for each servo track (STx) of the set the magnetic transitions in such servo track (STx) represent a periodic waveform when being read, and wherein the periodic waveforms of adjacent servo tracks (STx) are orthogonal to each other in their frequencies (fx).

3. The tape storage medium according to claim 2, wherein one period of each periodic waveform represents a symbol and wherein a maximum length of a symbol on the tape storage medium (TP) in any of the servo tracks (STx) is less than 5 µm, or less than 2 µm, or less than 1 µm, or less than 500 nm.

4. The tape storage medium according to claim 1, wherein the additional information is encoded in the servo pattern of each servo track (STx) of the set, and wherein all the additional information is encoded into the servo pattern of each servo track (STx) of the set.

5. The tape storage medium according to claim 1, wherein the additional information is encoded in the one or more of the servo tracks (STx) by one or more of Phase modulation,
Differential phase modulation,
Differential phase shift keying
On-off keying.

6. The tape storage medium according to claim 1, wherein the waveform of each servo track (ST) is a continuous waveform of the defined frequency.

7. A tape drive for reading and/or writing data from and/or to a tape storage medium, the tape storage medium (TP) comprising at least one servo band (SB) along a longitudinal extension (x) of the tape storage medium (TP) for supporting to determine positional information which servo band (SB) comprises a set of servo tracks (STx) extending along the longitudinal extension (x) of the tape storage medium (TP) and arranged next to each other, said tape drive comprising:

a tape head (TH) containing at least one servo reader (SR) assigned for reading from the servo band (SB), wherein a width (wSR) of the servo reader (SR) orthogonal to a longitudinal extension (x) of the tape storage medium (TP) when arranged in the tape drive is at least a width (wSTx) of a servo track (ST) in the servo band (SB) orthogonal to the longitudinal extension (x) of the tape storage medium (TP), and wherein each servo track (STx) of the set contains a servo pattern with magnetic transitions at a defined frequency (fx), wherein the frequencies (fx) of magnetic transitions of servo patterns of adjacent servo tracks (STx) are different from each other, and wherein the set of servo tracks (STx) contains at least three servo tracks (STx) with magnetic transitions of different frequencies (fx), and wherein additional information is encoded in the servo pattern of one or more servo tracks (STx), which additional information is one or more of: a longitudinal position information, a manufacturing information, a servo band identifier, or a servo track subset identifier.

8. The tape drive according to claim 7, wherein the width (wSR) of the servo reader (SR) is more than the width (wSTx) of a servo track (ST) in the servo band (SB) and is not more than twice the width (wSTx) of a servo track (ST) in the servo band (SB).

9. A method for operating a tape drive for reading and/or writing data for and/or to a tape storage medium, the tape storage medium (TP) comprising at least one servo band (SB) along a longitudinal extension (x) of the tape storage medium (TP) for supporting to determine positional information which servo band (SB) comprises a set of servo tracks (STx) extending along the longitudinal extension (x) of the tape storage medium (TP) and arranged next to each other, the method comprising:

reading a servo band (SB) by a servo reader (SR), determining a lateral position value of a tape head (TH) containing the servo reader (SR) relative to the tape storage medium (TP) from a readback signal of the servo reader (SR), and adjusting a lateral position of the tape head (TH) dependent on the lateral position value, wherein each servo track (STx) of the set contains a servo pattern with magnetic transitions at a defined frequency (fx), wherein the frequencies (fx) of magnetic transitions of servo patterns of adjacent servo tracks (STx) are different from each other, and wherein the set of servo tracks (STx) contains at least three servo tracks (STx) with magnetic transitions of different frequencies (fx), and wherein additional information is encoded in the servo pattern of one or more servo tracks (STx), which additional information is one or more of: a longitudinal position information, a manufacturing information, a servo band identifier, or a servo track subset identifier.

10. The method according to claim 9, wherein determining the lateral position value includes identifying one or more frequencies of periodic waveforms in the readback signal of the servo reader (SR).

11. The method according to claim 9, wherein the waveforms present in the readback signal of the servo reader (SR) are detected by applying a discrete Fourier transform for periodic waveforms for determining the lateral position value.

12. The method according to claim 10, wherein one or more ratios are built from energies of the waveforms at different frequencies (fx) identified, and wherein the lateral position value is derived from the one or more ratios.

13. The method according to claim 9, wherein the lateral position of the tape head (TH) is adjusted by a control signal that is updated each time a new lateral position value is determined.

14. A computer program product comprising a non-transitory computer readable medium having computer readable program code embodied therewith, the computer readable program code comprising computer readable program code configured to perform a method for operating a tape drive for reading and/or writing data for and/or to a tape storage medium, the tape storage medium (TP) comprising at least one servo band (SB) along a longitudinal extension (x) of the tape storage medium (TP) for supporting to determine positional information which servo band (SB) comprises a set of servo tracks (STx) extending along the longitudinal extension (x) of the tape storage medium (TP) and arranged next to each other, said method comprising:

reading a servo band (SB) by a servo reader (SR), determining a lateral position value of a tape head (TH) containing the servo reader (SR) relative to the tape storage medium (TP) from a readback signal of the servo reader (SR), and adjusting a lateral position of the tape head (TH) dependent on the lateral position value, wherein each servo track (STx) of the set contains a servo pattern with magnetic transitions at a defined frequency (fx), wherein the frequencies (fx) of magnetic transitions of servo patterns of adjacent servo tracks (STx) are different from each other, and wherein the set of servo tracks (STx) contains at least three servo tracks (STx) with magnetic transitions of different frequencies (fx), and wherein additional information is encoded in the servo pattern of one or more servo tracks (STx), which additional information is one or more of: a longitudinal position information, a manufacturing information, a servo band identifier, or a servo track subset identifier.

* * * * *